United States Patent
Noll et al.

(10) Patent No.: US 8,327,399 B2
(45) Date of Patent: Dec. 4, 2012

(54) SYSTEM AND METHOD FOR DELIVERING TARGETED ADVERTISING DATA IN AN INTERNET PROTOCOL TELEVISION SYSTEM

(75) Inventors: Roland Noll, San Antonio, TX (US); Jeffrey G. Weber, San Antonio, TX (US); Scott Alan Pettit, San Antonio, TX (US); Mary Catherina McCarthy, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1006 days.

(21) Appl. No.: 11/514,325

(22) Filed: Aug. 31, 2006

(65) Prior Publication Data
US 2008/0060002 A1    Mar. 6, 2008

(51) Int. Cl.
*H04N 7/025* (2006.01)
(52) U.S. Cl. .................. 725/34; 725/32; 725/39; 725/46
(58) Field of Classification Search .............. 725/32–36, 725/42, 95, 116, 39
See application file for complete search history.

(56) References Cited

U.S. PATENT DOCUMENTS

| | | | |
|---|---|---|---|
| 6,473,903 B2 | 10/2002 | Balakrishnan et al. | |
| 6,574,793 B1 | 6/2003 | Ngo et al. | |
| 2002/0016965 A1* | 2/2002 | Tomsen | 725/42 |
| 2002/0042914 A1* | 4/2002 | Walker et al. | 725/36 |
| 2002/0144260 A1* | 10/2002 | Devara | 725/32 |
| 2002/0184047 A1* | 12/2002 | Plotnick et al. | 705/1 |
| 2005/0193410 A1* | 9/2005 | Eldering | 725/34 |
| 2006/0085441 A1* | 4/2006 | Funk et al. | 707/100 |
| 2006/0200842 A1* | 9/2006 | Chapman et al. | 725/34 |
| 2007/0089127 A1* | 4/2007 | Flickinger et al. | 725/32 |
| 2007/0091926 A1* | 4/2007 | Apostolopoulos et al. | 370/473 |

* cited by examiner

*Primary Examiner* — Vivek Srivastava
*Assistant Examiner* — Anthony Bantamoi
(74) *Attorney, Agent, or Firm* — G. Michael Roebuck (57) ABSTRACT

A system and method for delivering targeted advertising data over an internet protocol television (IPTV) network are disclosed for multicasting from an IPTV server a group of targeted advertising data to a group of end user client devices; receiving at the IPTV server from an end user client device in the group of end user client devices selection data indicating selected targeted advertising data from the group data; and unicasting from the IPTV server to the end user client device follow-on advertising data related to the selected targeted advertising data. A client device is disclosed for receiving a multicast group of targeted advertising data, selecting one of the group of targeted advertising data and receiving follow-on advertising data related to the selected advertising data.

31 Claims, 9 Drawing Sheets

SYSTEM AND METHOD FOR DELIVERING TARGETED ADVERTISING DATA IN AN INTERNET PROTOCOL TELEVISION SYSTEM

FIELD OF THE DISCLOSURE

The present disclosure relates generally targeted advertising in a television system.

BACKGROUND

Advertisers can potentially save advertisement dollars by targeting their advertisements rather than indiscriminately broadcasting their advertisements to a general population of recipients. Advertisement distributors and providers that enable a targeting advertisement model can correspondingly increase their revenue per advertisement impression by providing targeted advertisement options for advertisers.

Targeted advertisements have historically been sent to large targeted geographic areas such as a particular city, so that regional advertisers reach only those advertisement recipients who are deemed by the advertiser as most likely to be responsive to their advertisements.

DETAILED DESCRIPTION

In a particular embodiment of the present invention a method for delivering targeted advertising data over an Internet Protocol Television (IPTV) network is disclosed. The method includes multicasting from an IPTV server a group of targeted advertising data to a group of end user client devices; receiving at the IPTV server from an end user client device in the group of end user client devices selection data indicating selected targeted advertising data from the group of targeted advertising data; and unicasting from the IPTV server to the end user client device follow-on advertising data related to the selected targeted advertising data.

In another aspect of a particular embodiment the group of targeted advertising data further includes group display queue data. The group display queue data includes data indicating a display mode for the group of advertising data and the follow-on advertising data further includes follow-on display queue data. The follow-on display queue data includes data indicating display mode data for the follow-on advertising data. The method further includes sending one of a plurality of group display queues data to each of the group of end user client devices. In another aspect of a particular embodiment the display mode data indicates advertising data for a main screen display, an on screen picture-in-picture (PIP) display and off screen PIP display. In another aspect of a particular embodiment the group of targeted advertising data further includes sub-group targeted advertising data wherein the group targeted advertising data contains advertising data targeted to the group of end user client devices and the sub-group targeted advertising data contains advertising data targeted to a sub-group of end user client devices. The method further includes multicasting the sub-group targeted advertising data to the sub-group of end user client devices. In another aspect of a particular embodiment the group data further includes household advertising data wherein the household advertising data contains advertising data targeted to a household. The method further including unicasting the household advertising data to an end user client device associated with the household. In another aspect of a particular embodiment the household advertising data further includes at least one individual viewer advertising data wherein the individual viewer data contains advertising data targeted to an individual viewer in the household. The method further includes unicasting the individual viewer advertising data to an end user client device associated with an individual viewer.

In another aspect of a particular embodiment the method further includes inserting the targeted advertising data into a video data stream at the IPTV server when a measured IPTV network value is above a predetermined value; and inserting the targeted advertising data at the end user client device when the measured IPTV network value is less than the predetermined value. In another aspect of a particular embodiment the measured IPTV network value is selected from the group consisting of available IPTV bandwidth between an IPTV server and the end user client device and available storage at the end user client device.

In another particular embodiment a computer readable medium containing a computer program for delivering targeted advertising data over an internet protocol television (IPTV) network is disclosed. The computer program includes instructions to multicast from an IPTV server a group of targeted advertising data to a group of end user client devices; instructions to receive at the IPTV server from an end user client device in the group of end user client devices selection data indicating selected targeted advertising data from the group of targeted advertising data; and instructions to unicast from the IPTV server to the end user client device follow-on advertising data related to the selected targeted advertising data. In another aspect of a particular embodiment wherein the group of targeted advertising data further includes group display queue data. The group display queue data includes data indicating a display mode for the group of advertising data and the follow-on advertising data further includes a follow-on display queue. The follow-on display queue includes data indicating display mode data for the follow-on advertising. The computer program further includes instructions to send one of a plurality of group display queues to each of the group of end user client devices. In another aspect of a particular embodiment the display mode data indicates advertising data for a main screen display, an on screen picture-in-picture (PIP) display and off screen PIP display.

In another aspect of a particular embodiment wherein the group of targeted advertising data further includes sub-group targeted advertising data wherein the group targeted advertising data contains advertising data targeted to the group of end user client devices and the sub-group targeted advertising data contains advertising data targeted to a sub-group of end user client devices. The computer program further includes instructions to multicast the sub-group targeted advertising data to the sub-group of end user client devices. In another aspect of a particular embodiment the group advertising data further includes at least one household advertising data wherein the household advertising data contains advertising data targeted to a household. The computer program further including instructions to unicast the household advertising data to an end user client device associated with the household.

In another aspect of a particular embodiment wherein the household advertising data further includes at least one individual viewer advertising data wherein the individual viewer data contains advertising data targeted to an individual viewer in the household. The computer program further including instructions to unicast the individual viewer advertising data to an end user client device associated with an individual viewer. In another aspect of a particular embodiment the computer program further includes instructions to insert the targeted advertising data into a video data stream at the IPTV server when a measured IPTV network value is above a predetermined value; and instructions to insert the targeted advertising data at the end user client device when the measured IPTV network value is less than the predetermined value. In another aspect of a particular embodiment the measured IPTV network value is selected from the group consisting of available IPTV bandwidth between an IPTV server and the end user client device and available storage at the end user client device.

In another particular embodiment a system for delivering targeted advertising data over an internet protocol television (IPTV) network is disclosed. The system includes a processor in data communication with an end user client device; a memory in data communication with the processor; and a computer program stored in memory, for execution by the processor. The computer program includes instructions to multicast from an IPTV server a group of targeted advertising data to a group of end user client devices; instructions to receive at the IPTV server from an end user client device in the group of end user client devices selection data indicating a selected targeted advertising data from the group data; and instructions to unicast from the IPTV server to the end user client device follow-on advertising data related to the one selected targeted advertising data.

In another aspect of a particular embodiment the group of targeted advertising data further comprises a group display queue. The group display queue including data indicating a display mode for the group of advertising data and the follow-on advertising data further comprises follow-on display queue data. The follow-on display queue data includes data indicating display mode data for the follow-on advertising.

The computer program further includes instructions to send one of a plurality of group display queues to each of the group of end user client devices. In another aspect of a particular embodiment the display mode data indicates advertising data for a main screen display, an on screen picture-in-picture (PIP) display and off screen PIP. In another aspect of a particular embodiment the group of targeted advertising data further includes sub-group targeted advertising data wherein the group targeted advertising data contains advertising data targeted to the group of end user client devices and the sub-group targeted advertising data contains advertising data targeted to a sub-group of end user client devices.

The computer program further includes instructions to multicast the sub-group targeted advertising data to the sub-group of end user client devices. In another aspect of a particular embodiment the group data further includes at least one household advertising data wherein the household advertising data contains advertising data targeted to a household. The computer program further includes instructions to unicast the household advertising data to an end user client device associated with the household. In another aspect of a particular embodiment the household advertising data further includes at least one individual viewer advertising data wherein the individual viewer data contains advertising data targeted to an individual viewer in the household. The computer program further includes instructions to unicast the individual viewer advertising data to an end user client device associated with an individual viewer.

In another aspect of a particular embodiment the computer program further includes instructions to insert the targeted advertising data into a video data stream at the IPTV server when a measured IPTV network value is above a predetermined value; and instructions to insert the targeted advertising data at the end user client device when the measured IPTV network value is less than the predetermined value. In another aspect of a particular embodiment the measured internet protocol television (IPTV) network value is selected from the group consisting of available IPTV bandwidth between an IPTV server and the end user client device and available storage at the end user client device.

In another particular embodiment a data structure in memory is disclosed. The data structure includes an advertising data field for containing advertising data indicating advertisements targeted to a group of end user client devices in an internet protocol television (IPTV) system; and a display queue field for containing data indicating display mode data for the advertising data. In another aspect of a particular embodiment the display mode data indicates advertising data for a main screen display, an on screen picture-in-picture (PIP) display and off screen PIP display In another aspect of a particular embodiment the data structure further includes a follow-on advertising data field for containing advertising data related to the advertising data in the advertising data field. In another aspect of a particular embodiment the data structure further includes an IPTV bandwidth available field for containing data indicating available bandwidth between an IPTV server and an end user client device; and a household storage available field for containing data indicating available storage at an end user client device associated with a household.

In another particular embodiment a client device for receiving targeted advertising data from an internet protocol television (IPTV) server is disclosed. The client device including a processor coupled to a memory; and a computer program stored in the memory for execution by the processor. The computer program includes instructions to receive from an internet protocol television (IPTV) server a multicast including a group of targeted advertising data, instructions to send to the IPTV server selection data indicating selected targeted advertising data selected from the group of targeted advertising data and instructions to receive a unicast from the IPTV server follow-on advertising data related to the selected targeted advertising data.

In another aspect of a particular embodiment the group of targeted advertising data further includes group display queue data. The group display queue data includes data indicating a display mode for the group of advertising data and the follow-on advertising data further includes a follow-on display queue, the follow-on display queue includes data indicating a display mode for the follow-on advertising. The computer program further includes instructions receive group display queue and display the group of targeted advertising data in the mode in the group display queue. In another aspect of a particular embodiment the display queue data indicates advertising data for a main screen display, an on screen picture-in-picture (PIP) display and off screen PIP display.

In another particular embodiment a computer readable medium containing a computer program for receiving targeted advertising from an internet protocol television (IPTV) server is disclosed. The computer program includes instructions to receive from an IPTV server a multicast comprising a group of targeted advertising data; instructions to send to the IPTV server selection data indicating selected targeted advertising data from the group of targeted advertising data; and instructions to receive from the IPTV server a unicast of follow-on advertising data related to the selected targeted advertising data.

In a particular illustrative embodiment, groups of advertisements (advertisings) or advertising data are inserted into an IPTV video stream at the time of the spot. The group of advertisements is displayed on an end user device display. A group queue is sent containing data to indicate a display mode (which advertising data is main display advertisement, which advertising data are on screen PIPs, and which advertising data are off screen PIPs that can be scrolled onto the screen as on screen PIPs using an up and down carrot on the display screen). When a customer makes an advertising selection from the group of displayed advertisements, the selected advertisement would then be fed down to play during the 30 seconds. An IPTV network tracking in the traffic and billing system would capture the need to bill the advertiser for their commercial time, and also capture the selection made and ties the selection to a particular set-top box (STB) helping the provider build a preference database for the video account for the subscriber household and each viewer in the subscriber household. Follow-on advertisings and a follow-on display queue which relate to the selected advertising are also sent to the end user device.

The illustrative embodiment would have benefits include relevant information for the consumer—decreasing their frustration with traditional commercials, better targeting for the advertiser—increasing the chance that the advertising will result in a sale, the building of a preference database—enabling better programming choices targeted at the household. A particular illustrative embodiment may also conserve IPTV network bandwidth and end user device storage space.

Figure 1:
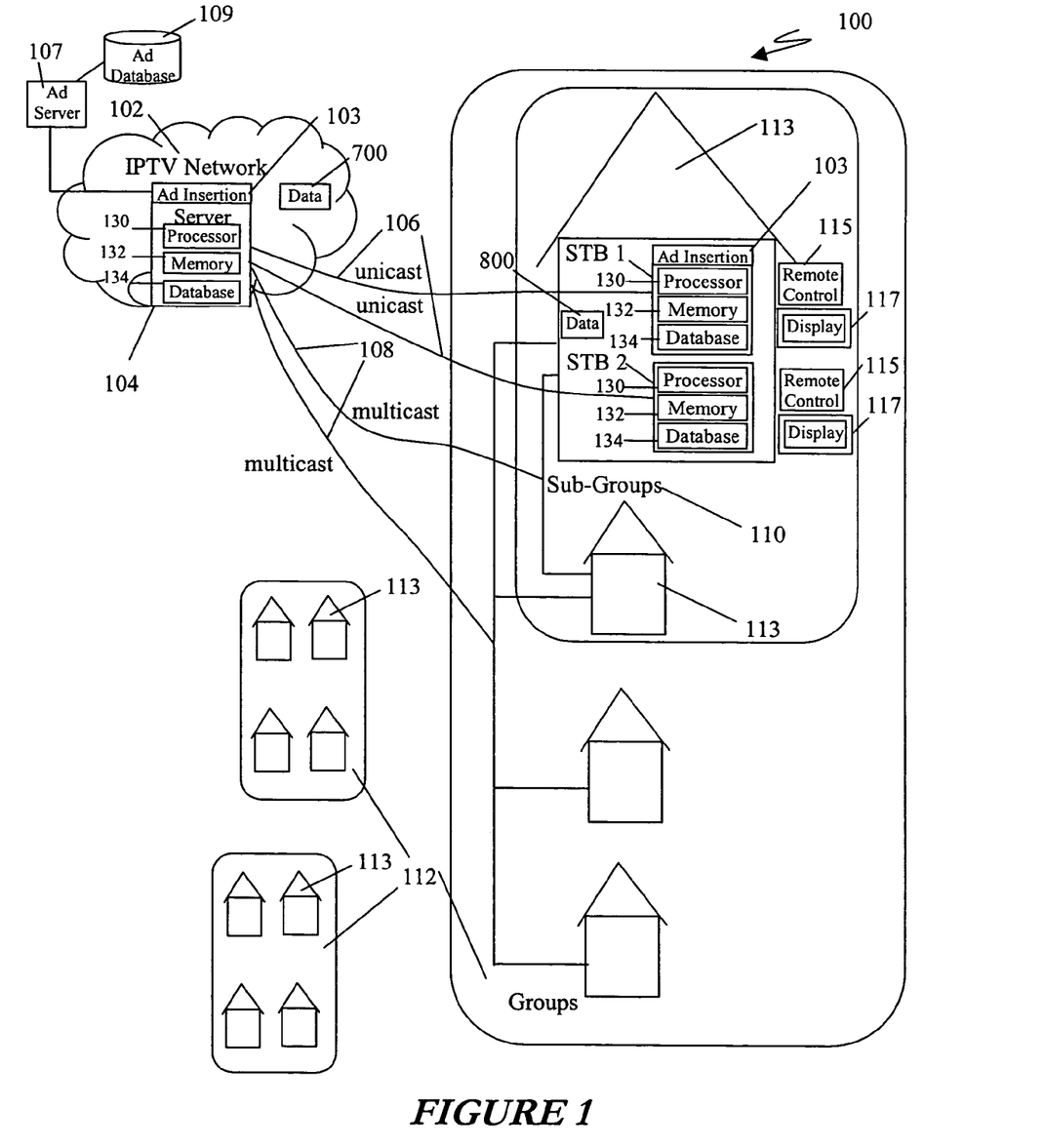
FIG. 1 depicts an illustrative embodiment of an IPTV system delivering targeted advertising to an end user client device.

Turning now to FIG. 1 as shown in FIG. 1 the IPTV network 102 delivers content and advertising to the server 104. The server 104 delivers content and advertising via unicast or multicast depending on the target group of end user client devices to which the advertising is directed. As shown in FIG. 1 groups 112 receive multicast 108 advertising from server 104. Sub-groups 110 receive multicast 108 advertising from server 104. Individual households receive unicast 106 advertising to set top box 111. More then one set top box can be located in an individual household 113 and each individual set top box can receive a separate unicast advertising stream 106. Having a separate advertising displayed at each set top box (STB) 111 tailored to target the subscriber watching television at that particular STB. Each server 104 and STB 111 contains a processor 130, a memory 132 and a database 134. Each STB 111 has an associated remote control 115 and display 117.

FIG. 1 depicts an illustrative advertising insertion system wherein advertisings can be inserted at the IPTV server or at the end user client device, for example, an STB. Advertising data can be inserted into an IPTV video stream via advertising insertion device 103 at the IPTV server 104 or the STB 111. The IPTV server includes an advertising server 107 and an advertising database 109. The advertising data is selected from the advertising database and delivered by the advertising server 107 to the IPTV server 104.

Figure 2:
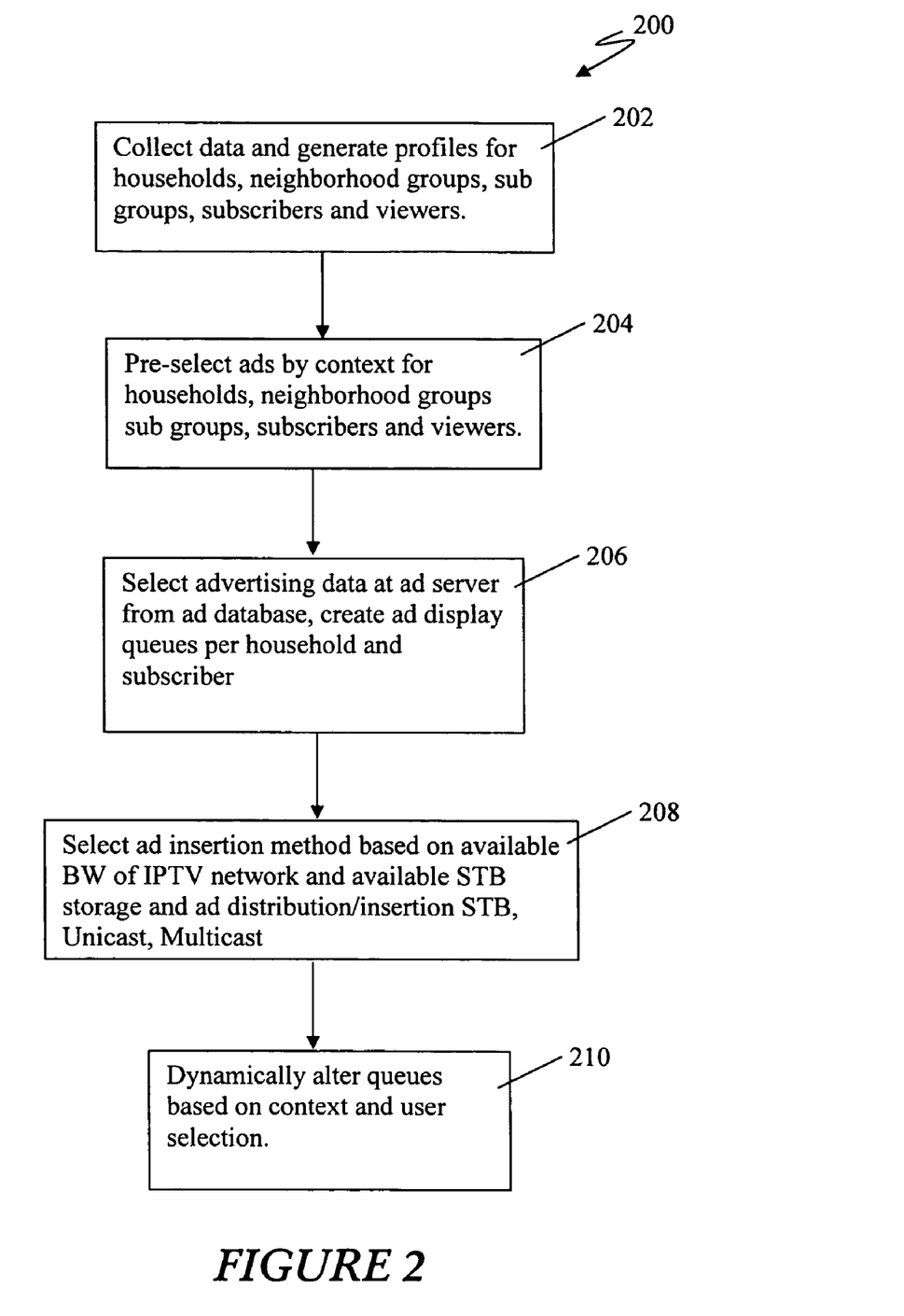
FIG. 2 depicts a flow chart of functions performed in an illustrative embodiment.

Turning now to FIG. 2 in an illustrative embodiment a set of functions are performed as shown in flow chart 200. At block 202 an illustrative embodiment IPTV system collects data and generates profiles for subscribers, viewers, households and neighborhoods. The neighborhoods represent groups or sub-groups of households containing one or more end user client devices (STBs) associated with one or more IPTV subscribers or viewers. Each household may have one or more client devices or STBs which receive IPTV video streams and inserted advertising or advertising data to be inserted into the WPTV video stream. At block 204 advertisements are preselected for distribution to users, households, sub-groups and groups of end user client devices. The sub-groups can be smaller than the groups and can represent partial selection of a particular group. The advertisings are selected by context for the users, households of end user client devices, and groups. Context includes but is not limited to available IPTV bandwidth between the IPTV server and the end user client device available bandwidth at the end user client device, the demographics and interests for the subscribers/viewers, households and groups as well as the geographical location of the users, households, and groups or sub-groups as correlated with the advertisement target segment of subscribers/viewers chosen by an advertiser.

Advertisement target segment includes the demographics and interests of the users as well as their geographic location. Context may also include what IPTV video stream is currently being displayed or viewed at a particular set top box by a viewer. The terms viewer and subscriber are used interchangeably herein. At block 206 the illustrative embodiment creates advertising queues for each household, viewer and group or sub-group. For each household, viewer and group or sub-group and group display queue, advertising data is generated for on screen advertisings. The group display queue indicates which advertisings are displayed as on screen picture-in-picture displays (PIPs), which are off screen scrollable PIPs and which advertising is the main advertising. The second group of advertising data are preselected advertisings that are off screen PIP advertisings that can be scrolled onto the screen as on screen PIP advertisings.

The illustrative embodiment also generates a follow-on queue and follow-on advertisements (FOA) which are related to the on screen advertisings which are queued to be presented to the viewer upon selection of one of the advertisings in the on screen queue which are to be displayed upon selection of an on screen advertising. An on screen advertising can be selected for main screen display or for FOA. Thus when a viewer selects an on screen advertising using a remote control by placing a cursor over the on screen advertising on the display device, the on screen advertising previously displayed as a PIP advertising becomes the main display and the FOA advertisings related to the selected on screen PIP advertising (which is now the main screen advertising) are moved to the on screen queue and displayed as on screen PIP advertising. In block 208 the illustrative embodiment selects an advertising delivery method based on available IPTV network bandwidth. The illustrative embodiment also selects an advertising distribution insertion method based upon available IPTV bandwidth and storage at an end user device (i.e., STB), that is, whether or not the advertising and queues will be inserted at the IPTV server and delivered in unicast or multicast or whether the advertising and queues will be delivered to the set top box for insertion at STB during viewing by a subscriber.

At block 210 the illustrative embodiment dynamically alters the queues and advertising data based on the context and the user selection. The inserted advertising data and display queues vary depending on the profile for a group, sub-group, household or viewer targeted. A group of 25 advertisings data can be multicast to 25 group members and 25 different unique group display queues sent to each group member (multicast or unicast) so that each group member has a unique display queue and sees unique main screen advertising and on screen PIPs displayed. Thus a group of 25 advertisings may contain advertisings targeted to different sub-groups and each sub-group receives a different display queue indicating a different set of advertisings from the 25 multicast advertisings in the group advertising data. The display queue data is much smaller than the advertising data and thus requires less bandwidth to transmit queue data when compared to transmitting advertising data.

In another example, each of 5 groups of advertising data can be selected to be sent to different 5 sub groups of end user devices. Each of the 5 groups of advertising data may have 3 advertisings in common, thus there are total of 13 unique advertisings data to be sent to the 5 sub groups (5×2 unique advertisings in each advertising data sub group plus the 3 common advertisings data). These 13 unique advertisings data can be combined into a single multicast and sent to each of the members of the 5 sub groups of end user client devices. One of 5 unique display queue data can be multicast to each of the 5 sub groups of end user devices. Thus each sub-group selects and displays the 5 advertisings from the 13 unique advertising based on the advertising data display queue data. Thus, as the advertising data is much larger than the display queue data, it takes less bandwidth to transmit the 13 unique advertisings data to each of the 5 sub-groups along with 5 small display queue data than to generate 5 separate multicasts of 5 advertisings data to each of the 5 sub groups of end user devices. The advertising data display queues data can also be unicast to each end user device.

Figure 3:
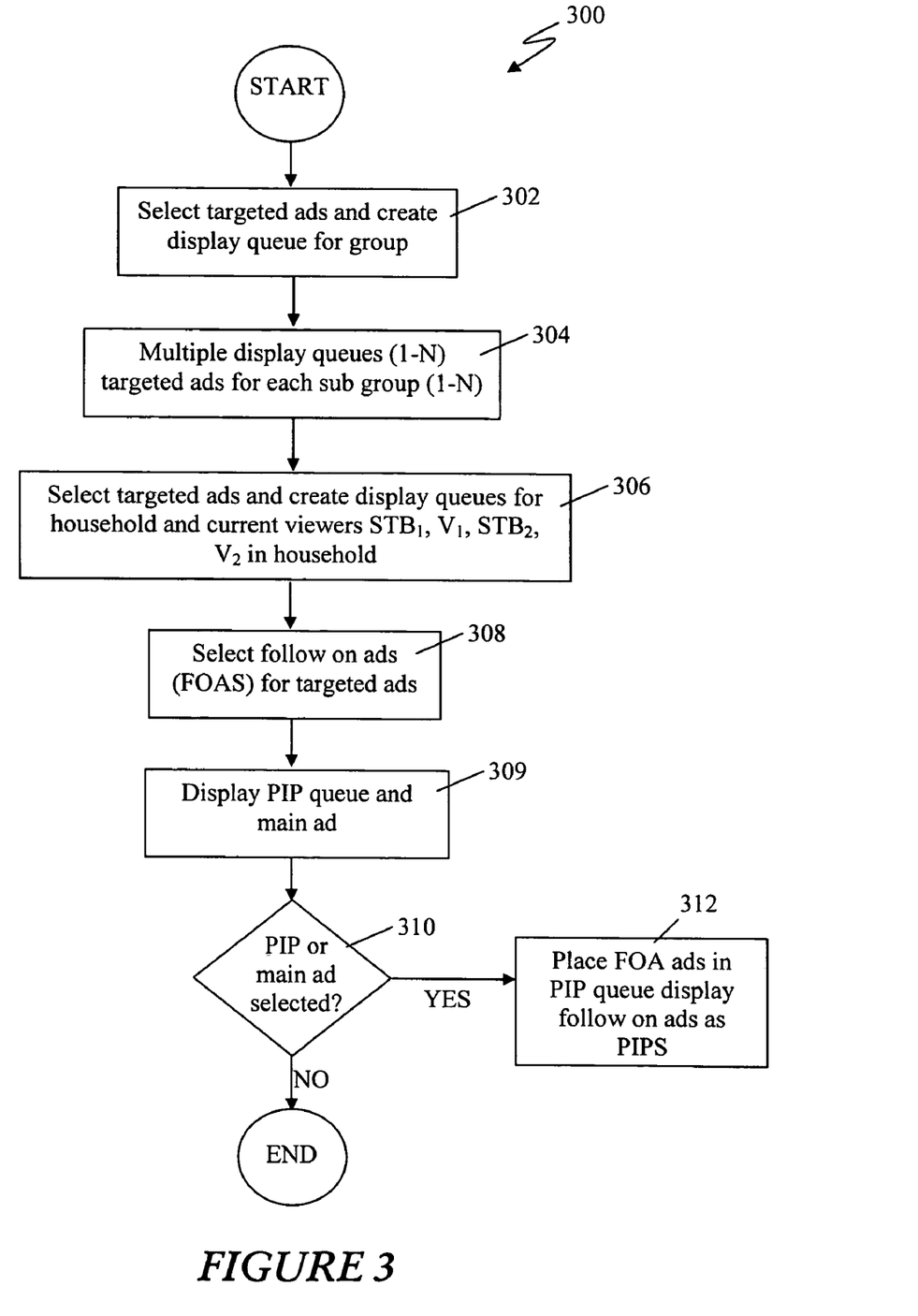
FIG. 3 depicts a flow chart of functions performed in an illustrative embodiment.

Turning now to FIG. 3 a flow chart of functions 300 is illustrated which are performed in an illustrative embodiment. In block 302 an illustrative embodiment selects targeted advertisings data for a group. These targeted advertisings relate to local interests, demographics, and geographical location of the group. For instance, the local car dealer or local pizza parlor may be interested in reaching all members of a particular group or in a particular neighborhood and thus would select a targeted advertising for a particular area which is geographically proximate to the local car dealer or pizza parlor wanting to reach that group or neighborhood via targeted advertising. In block 304 multiple sub-group display queues are generated for sub-groups within each group. There can be two display queues generated, one selecting sports cars for display from the advertising data to some members of the group and another display queue selecting trucks for display to other members of the group.

There may be one or more sub-groups within a particular group of viewers or subscribers at end user devices. The sub-groups can be narrower focus and smaller than a group. For example a particular advertiser may only want to reach households within the neighborhood that have children under the age of 2 to advertise diapers. That is only those households having children under the age of 2 will be targeted to receive the diaper advertising and will be included in a sub-group targeting those households. Thus sub-groups can be targeted by selective delivery of targeted advertising data or by selective display queues of targeted advertising data. In block 306 targeted advertisings is selected and queues created for households including current IPTV viewers watching an IPTV video stream within each household at one or more STBs. In block 308 the fourth queue for follow-on advertisings is generated for selected advertisings that a user or subscriber has selected from a PIP or on the main screen. An illustrative embodiment also provides a back button on the screen to restore the display to its previous state or mode. The selected PIP advertisement becomes the main screen advertising (a selected main screen advertising stays as the main screen advertising) and the follow-on advertisings which are related to the selected advertising are sent to the placed in the follow-on queue and queued in display on the associated display as PIP advertising displays related to the selected advertising which is now the main screen advertising. In block 310 it is determined whether or not an on screen advertising has been selected. If an on screen advertising has been selected from a PIP or the main screen, then the follow-on advertisings for the selected advertising are displayed as PIP advertisings on screen along with the selected advertising as the main display.

Figure 4:
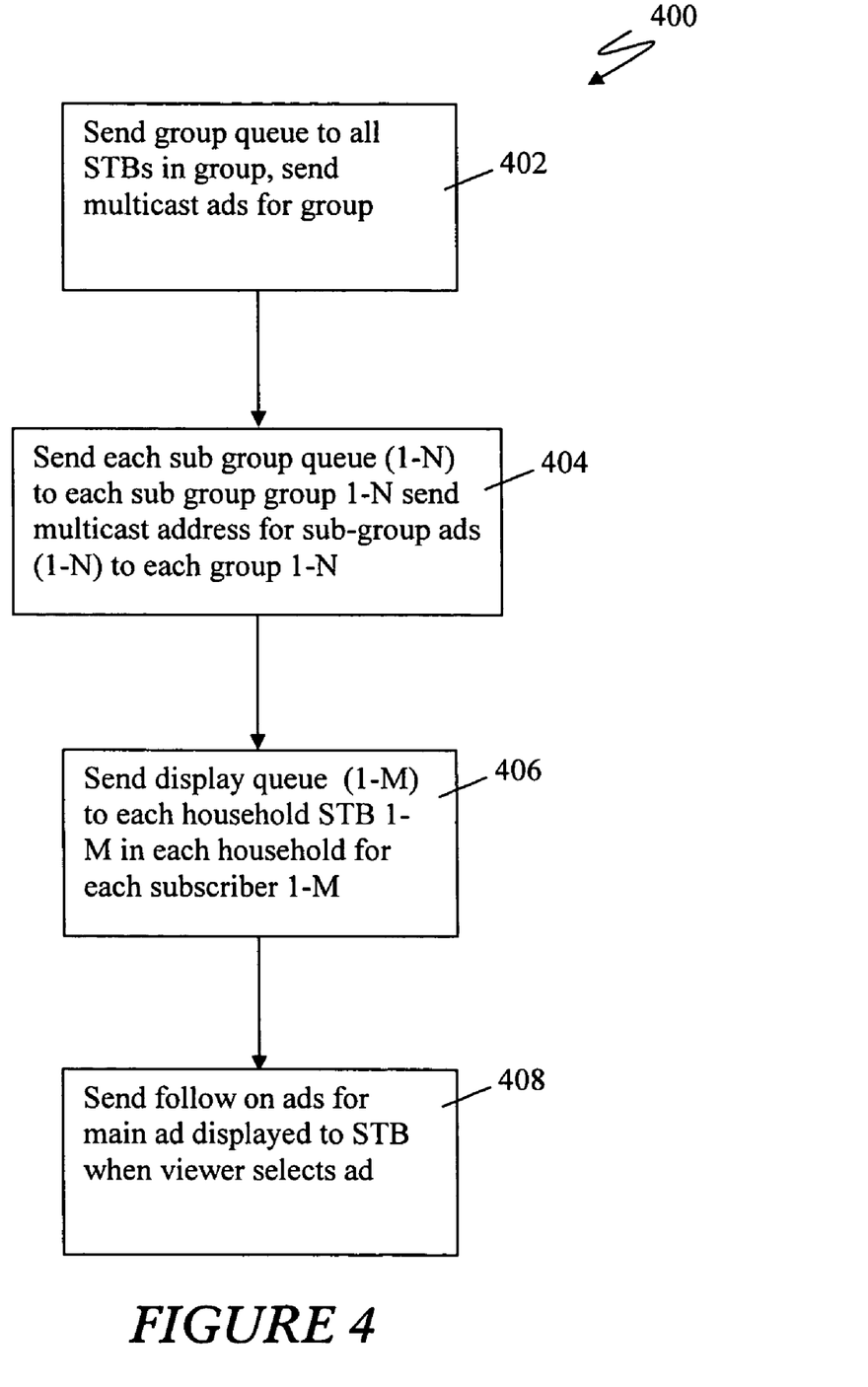
FIG. 4 depicts a flow chart of functions performed in an illustrative embodiment.

Turning now to FIG. 4 in an illustrative embodiment a series of functions as shown in flow chart 400 are performed. The functions as shown in the figures and flow darts are not performed in any particular order and no order of performance is intended or implied by the order of the functions in the flow charts herein. As shown in FIG. 4 at block 402 the illustrative embodiment multicasts the group advertising data to all neighborhood STBs. A unique and separate group display queue can be unicast to each STB. The unique group display queues can also be multicast along with the group advertising data to all members of the group. Each unique group queue multicast can contain a unique identifier indicating to which end user client device (STB) each unique group queue pertains. The multicast advertisings data in the group advertising data are sent to all group STBs.

As shown in block 404, the illustrative embodiment multicasts each sub-group advertising data (1-N) to each sub-group (1-N) and sends the multicast address for the group or sub-group advertising to each group (1-N). As shown in block 406 an illustrative embodiment unicasts a household advertising data and a household display queue to each household 1-M and each STB in each household for each subscriber 1-M. As shown in block 408 the illustrative embodiment unicasts follow up advertisings to the end user device to display when an advertising is selected from a PIP display on the display. The follow-on advertisings are unicast and displayed whenever an advertising is selected from an end user device display.

Figure 5:
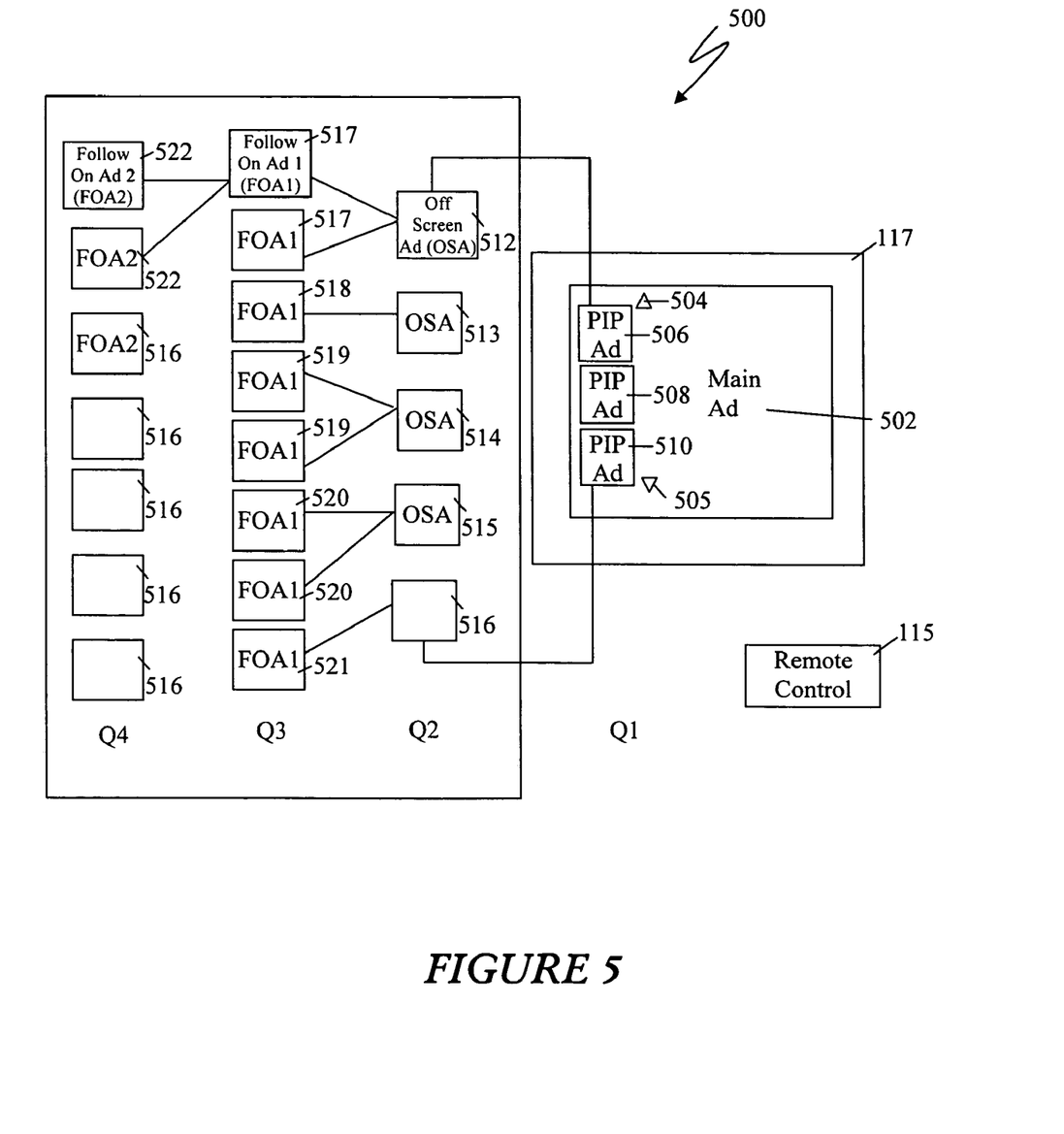
FIG. 5 depicts display queues for on screen advertisings, off screen advertisings and follow-on advertisings in an illustrative embodiment.

Turning now to FIG. 5 a schematic example of how the advertising data are manipulated and displayed in an illustrative embodiment is depicted. As shown in FIG. 5 the main display 117 displays a main advertising 502 and three on screen PIP advertisings 506, 508, and 510. The on screen advertisings as illustrated in the PIP can be scrolled up or down by positioning the remote control cursor over the up arrow 504 or the down arrow 505. Selecting the up arrow 504 causes the lower element of off screen advertisings 512 to be displayed and the PIP 506 to be scrolled up and off the main advertising display 502. The lower element 512 of the off screen advertisings then replaces PIP screen advertisings 510 and 510 PIP screen advertising and PIP screen advertising 508 move up one position. Similarly when the down screen arrow 505 is selected the upper element of the off screen advertising PIP queue 512 displaces the top elements screen advertising 506 and 506 and 508 move down on the PIP screen display and PIP advertising 510 scrolls down and off the main advertising display. When one of the PIP screen advertisings 506, 508, or 510 are selected using the remote control 115 then the selected PIP screen advertising is moved to the main display 502 and the follow up advertisings for the selected PIP screen advertising are moved into the PIP queue and displayed in PIPs. The display queue sent along with the advertising data (group, sub-group, household, viewer and follow-on) defines the display mode. The display mode defines which advertising data is the main screen, which are on screen PIPs and off screen PIPs.

Figure 6:
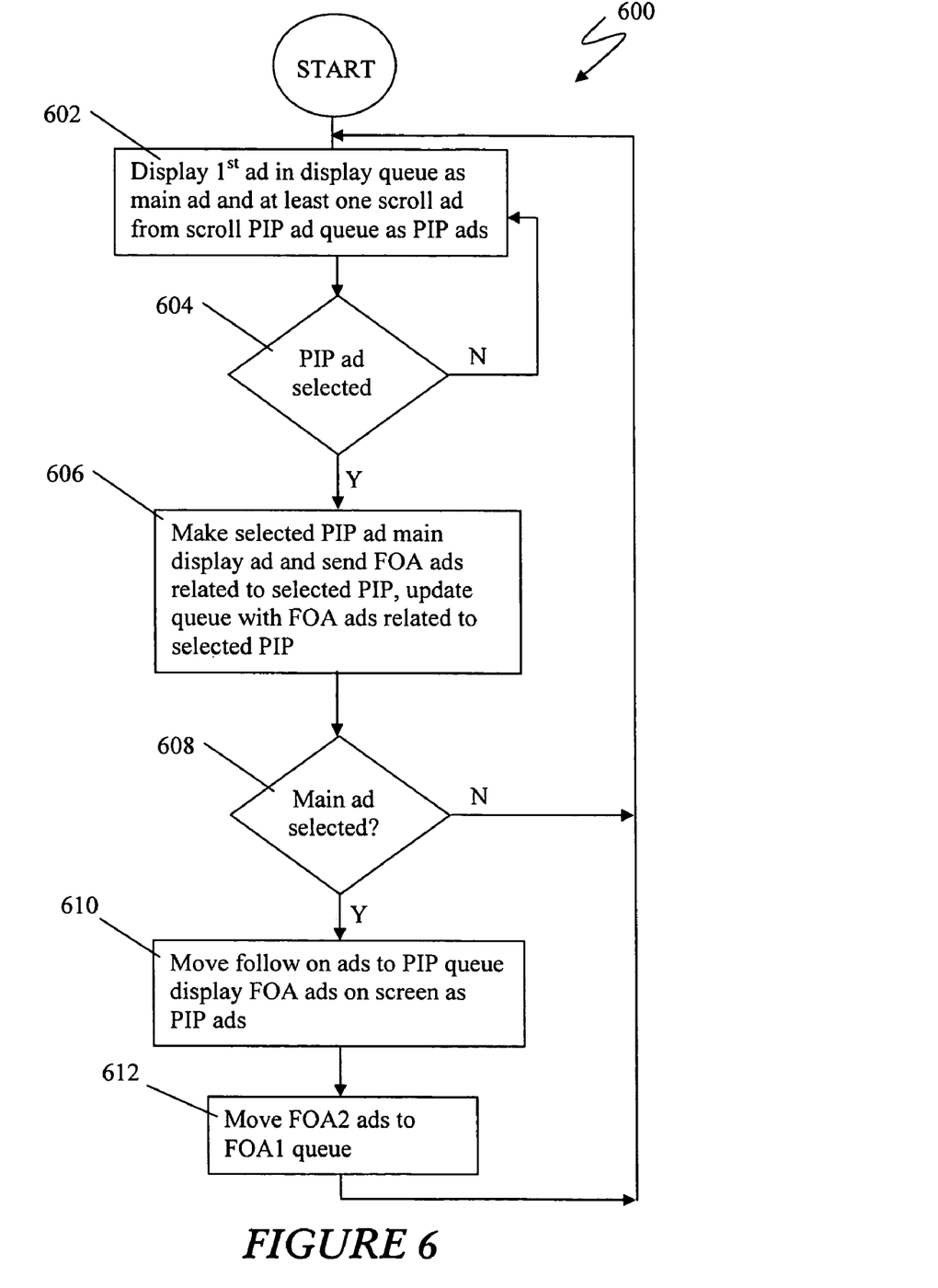
FIG. 6 depicts a flow chart of functions performed in an illustrative embodiment.

Turning now to FIG. 6 as shown in flow chart 600 in an illustrative embodiment the following functions as shown in flow chart 600 are performed. As shown in block 602 the main advertising is displayed and at least one on screen PIP advertising from the PIP on screen advertising queue are displayed as PIP advertisings on the main display. As shown in block 604 if a PIP advertising is selected the illustrative embodiment makes the selected PIP advertising the main advertising display and sends the follow-on advertisings related to the selected PIP advertisings to the on screen queue. The follow-on advertisings are then displayed as PIP advertisings on the main display.

Figure 7:
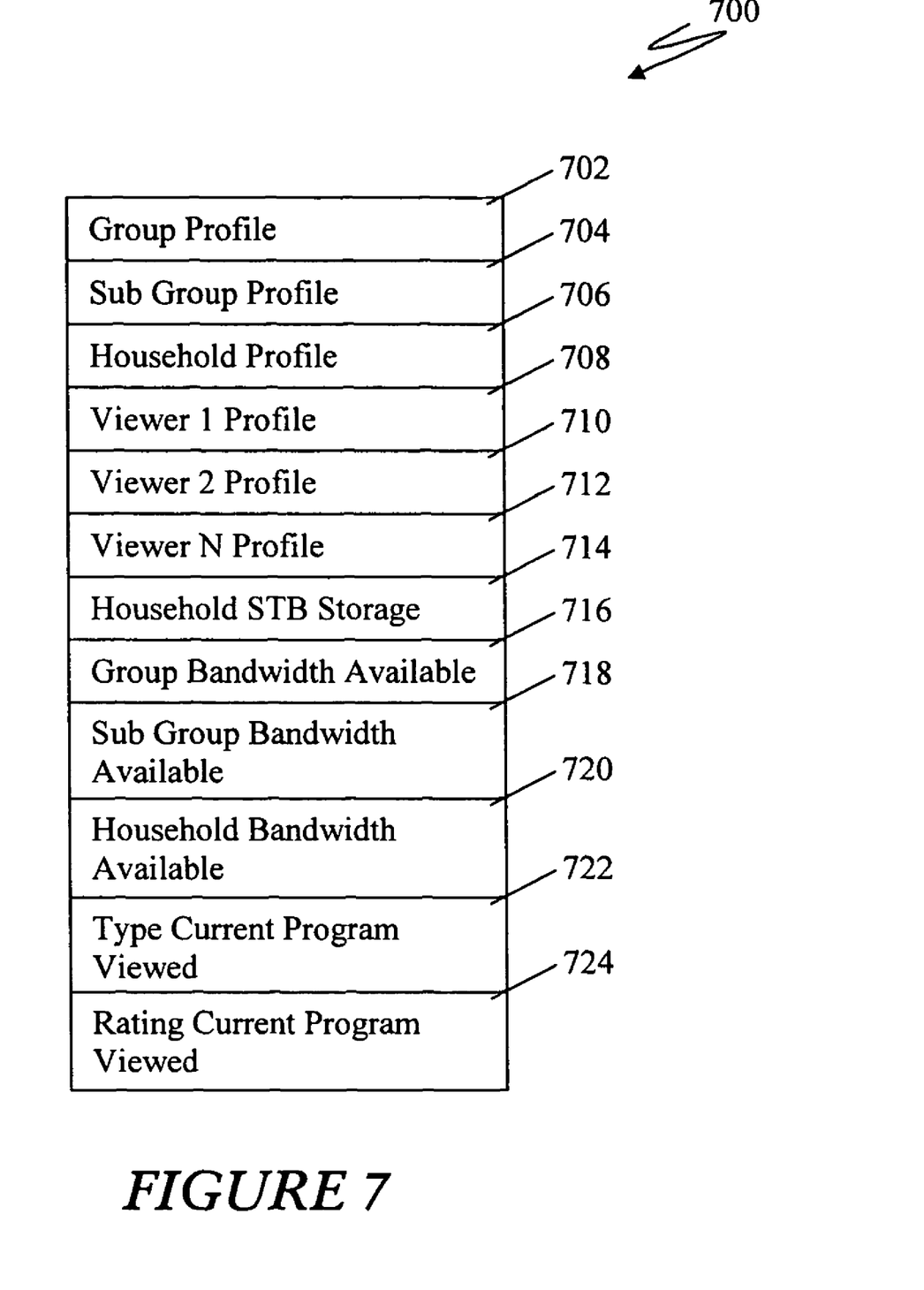
FIGS. 7 and 8 depict data structures provided in an illustrative embodiment.

Turning now to FIG. 7 in an illustrative embodiment a data structure is provided embedded in memory wherein data is stored representing values for operation of the illustrative embodiment as disclosed herein. As shown in FIG. 7 at 702 a group profile data field is provided for containing data indicating a profile for a group. As shown in 704 a sub-group profile field is shown for containing data indicative of a profile for a sub-group. At 706 a household profile field is shown for storing data indicative of a profile for a household. At 708 a viewer 1 profile field is shown for storing data indicative of a profile for a first viewer or viewer 1 within a household. At 710 a viewer 2 profile field is shown for containing data indicative of a profile for a second viewer within the same household. At 714 a household STB storage field is shown for indicating the available storage within a particular set top box at a household.

There may be more than one STB storage data field associated with one or more STB storage devices within a particular household. In a particular embodiment advertising data can be sent to an STB for insertion at the STB when the STB has sufficient storage to hold the advertising data recording. Thus, if a predetermined amount of storage (for example, 1 gigabyte) is available the advertising data can be sent to the STB for storage. At 716 a group bandwidth available field is illustrated for holding data indicative of a bandwidth available between an IPTV server and a group of selected set top boxes for targeting advertising data delivery. In another particular embodiment if the IPTV available bandwidth exceeds a predetermined value, for example, 50% then the advertising data can be inserted at the IPTV server. At 718 a sub-group bandwidth available field is shown for containing data indicative of a bandwidth available between an IPTV server and a sub-group of client devices or set top boxes within the selected sub-groups. At 720 a household bandwidth available field is shown for holding data indicative of an available bandwidth between an IPTV server and a household containing one or more STBs or end user client devices.

At 722 a type current program viewed field is shown for containing data indicative of the type of program that is currently being viewed by a particular viewer at a particular set top box. The type current program may indicate whether or not the program type is sports, news, entertainment, travel, or some other category as well as a rating for the program being viewed. At 724 a rating current program viewed field is shown for storing the rating of the current program being viewed at a particular set top box by a particular viewer. If the rating is a movie it may be rated by the Motion Picture Association of America (MPAA) ratings standards including NC17, R. PG, PG13 and G. Thus follow-on advertisings can be selected that match a MPAA rating for a program or for a viewer who allows or sets an MPAA rating for FOA advertisings.

Figure 8:
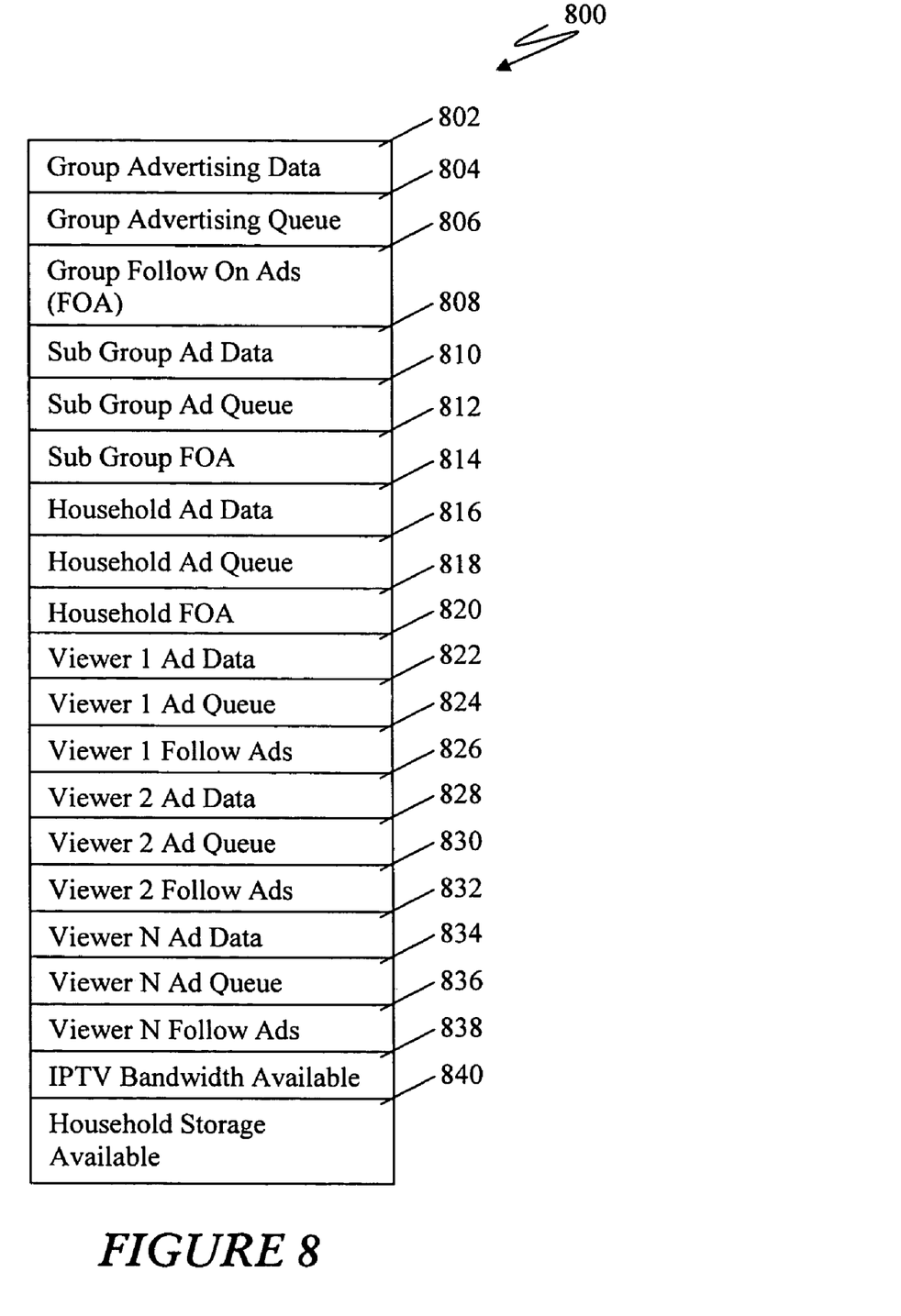

Turning now to FIG. 8, a data structure 800 is provided for storing data in an illustrative embodiment. At 802 a group advertising data field is illustrated for storing advertising data for a particular group. At 804 a group advertising queue data field is shown for storing data indicative of a queue for the advertising data in the group advertising data. At 806 a group follow-on advertisings data field is provided for holding follow-on advertisings data and follow-on display queue data related to the group advertising data. At 808 a sub-group advertising data field is provided for storing data comprising advertising data targeted to a particular sub-group. At 810 a sub-group advertising queue field is provided for storing a sub-group advertising display queue for advertising data directed to a particular sub-group. At 812 a sub-group follow-on advertising data field is provided for storing data indicative of follow-on advertisings and follow-on advertising queue related to the advertising data directed to the particular sub-group. At 814 a household advertising data field is illustrated for containing data indicative of household advertising data and a household display queue targeted to a particular household. At 816 a household advertising queue data field is illustrated for holding data indicative a household advertising queue for arranging display of the household advertising data. At 818 a household follow-on advertising data field is illustrated for containing follow-on advertisings and a follow-on display queue related to the household advertising data. At 820 a viewer 1 advertising data field is provided for containing advertising data targeted to a particular first viewer. At 822 a viewer display queue field is provided for storing an advertising data queue data for the first viewer. At 824 a viewer 1 follow-on advertisings data field is illustrated for storing follow-on advertisings data and a display queue related to the viewer 1 advertising data. Advertising data, queue data and follow-on advertisings data for viewers 2-N are stored in the data structure in fields 826-836. At 838 an IPTV bandwidth available field is shown for storing data indicative of IPTV bandwidth available between an IPTV server and a group, sub-group, household, or end user client device associated with a particular viewer or subscriber. At 840 a household storage available field is shown for containing data indicative of the amount of storage available at a particular end user client device (e.g., STB) associated with a household or a particular subscriber or viewer.

Figure 9:
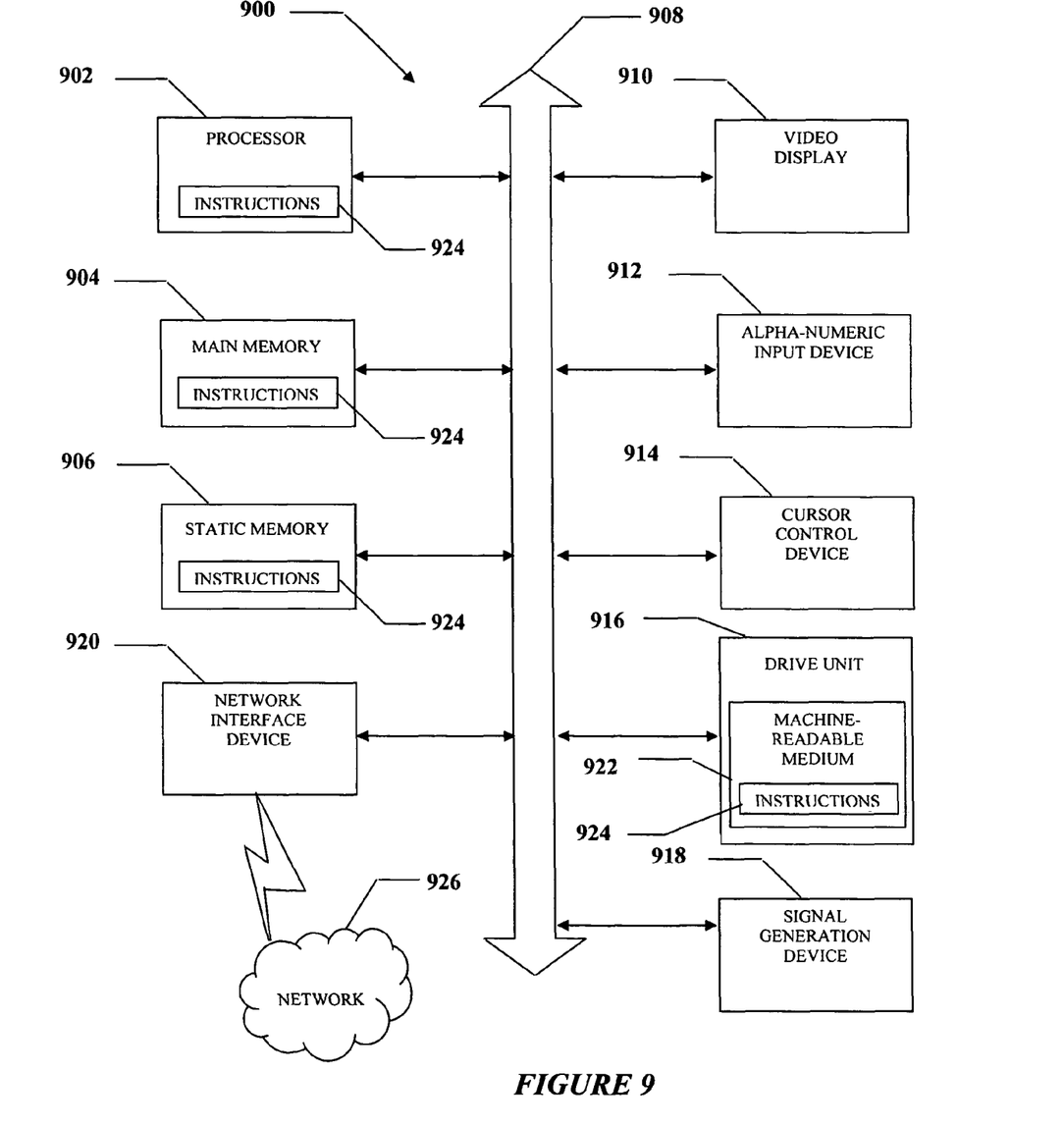
FIG. 9 is an illustrative embodiment of a machine for performing functions disclosed.

FIG. 9 is a diagrammatic representation of a machine in the form of a computer system 900 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., liquid crystals display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface 9.

The disk drive unit 916 may include a machine-readable medium 922 on which is stored one or more sets of instructions (e.g., software 924) embodying any one or more of the methodologies or functions described herein, including those methods illustrated in herein above. The instructions 924 may also reside, completely or at least partially, within the main memory 904, the static memory 906, and/or within the processor 902 during execution thereof by the computer system 900. The main memory 904 and the processor 902 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the tangible non-transitory machine-readable storage medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

In another illustrative embodiment a user can select a video or audio stream to be sent to an external audio or video device outside of the home via the IPTV network. In another illustrative embodiment a user can receive a video or audio from the house from a remote receiver or IP device and/or establish video or audio communication between the remote location and the audio and/or video devices in the home. In another illustrative embodiment motion detection on a camera sends alert to an STB of viewers with who a viewer wishes to communicate, alternatively email/SMS to additional device. In another illustrative embodiment, with management of available viewers at STBs and a buddy list to set up video sessions or audio with friends and neighbors. In another illustrative embodiment peer to peer video distribution "live broadcast" is provided.

In another illustrative embodiment a method for monitoring home remotely or controlling appliances in home via IPTV interface/portal is provided. Technologies to use are Zigbee, XIO, or RF remotes.

In another illustrative embodiment, IP-TV user interface is provided for that contains easy wizards to (1) identify Zigbee and RFID supported devices dynamically and incorporate functionality into the control interface, (2) let user set up X10 control codes for various appliances based on what she has configured in her home, (3) include smart remote capability to let user define other audio and/or video equipment in the home and where it is, so RF can be used to control other devices (and in this case the "closest" STB could be used to transfer the RF signals if it is with the other audio and/or video equipment to be controlled).

It should be noted that while the preferred embodiment of this video distribution architecture utilizes a FTTN or FTTH broadband network for IPTV delivery, it could similarly be implemented to work on alternative access networks including digital cable networks, satellite television systems, terrestrial wireless delivery networks (e.g. WiMAX) as bandwidth improves, or even 3G and 4G wireless networks using wireless handsets as the video authoring station.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for delivering targeted advertising data over an Internet Protocol Television (IPTV) network comprising:
   receiving at one of a plurality of end user devices, targeted advertising data comprising a plurality of group advertisements, advertising queue data indicating a sub group of advertisements comprising less than all of the plurality of group advertisements which apply to each of the plurality of end user devices and display mode data indicating which of the sub group, of advertisements are presented at the end user devices in a main display, an on screen picture in picture (PIP) display and an off-screen queue scrollable to an on screen display, and together with a plurality of follow-on advertisements for at least one of the sub group advertisements, wherein the end user client device accepts end user input data and controls which one of the sub group of advertisements appears in the PIP and wherein the end user client device moves the plurality of follow-on advertisements to the PIP display and a scrollable follow-on queue indicating the plurality of follow-on advertisements relating to the advertisement in the main display, when one of the sub group advertisements is selected from the PIP display and less than all of the plurality of follow-on advertisements are displayed in an on screen PIP queue display,
   wherein the display mode data indicates how the sub group advertisements and follow-on advertisements are displayed as a main screen display, an on screen picture-in-picture (PIP) display and off screen PIPs to be scrolled on to the end user client device PIP display queue;
   displaying in the PIP queue display, a set of follow-on advertisements comprising less-than all of the plurality of follow-on advertisements;
   rotating one of the set of follow-on advertisements off of the on-screen PIP queue display to an off-screen storage; and
   rotating another one of the follow-on advertisements from the off-screen storage to the on screen PIP queue display.

2. The method of claim 1, wherein the group of targeted advertisements further comprises a group display queue, the group display queue comprising data indicating which of the plurality of group advertisements are to be displayed at the end user device and a display mode at the end user device for the group of advertisements and wherein the follow-on advertisements further comprise a follow-on display queue, the follow-on display queue comprising data indicating display mode data for the follow-on advertisements, wherein the display mode indicates PIP display and-positions-for the-follow-on advertisements in the scrollable queue.

3. The method of claim 1, wherein the group of targeted advertisements further comprises sub-group targeted advertisements wherein the group targeted advertising data contains advertising data targeted to the group of end user client devices and the sub-group targeted advertising data contains advertising data targeted to a sub-group of end user client devices, the method further comprising multicasting the sub-group targeted advertisements advertising data to the sub-group of end user client devices.

4. The method of claim 1, wherein the group advertisements further comprises household advertisements wherein the household advertisements contains advertisements targeted to a household, the method further comprising unicasting the household advertisements to an end user client device associated with the household.

5. The method of claim 4, wherein the household advertisements further comprises at least one individual viewer data wherein the individual viewer data contains at least one advertisement targeted to an individual viewer in the household, the method further comprising unicasting the individual viewer advertisement to an end user client device associated with an individual viewer.

6. The method of claim 1, further comprising inserting the targeted advertisements into a video data stream at the IPTV server when a measured IPTV network value is above a predetermined value; and
   inserting the targeted advertising data at the end user client device when the measured IPTV network value is less than the predetermined value.

7. The method of claim 6, wherein the measured IPTV network value is selected from the group consisting of available IPTV bandwidth between an IPTV server and the plurality of end user client devices and available storage at the end user client devices.

8. A tangible non-transitory computer readable storage medium containing a computer program for delivering targeted advertisements over an internet protocol television (IPTV) network, the computer program comprising:
   instructions to receive a multicast from an IPTV server, a group of targeted advertising data to a group of end user client devices together with a plurality of follow-on advertisements for at least one of the sub group advertisements, wherein the end user client device accepts end user input data controls which one of the sub group of advertisements appears in the PIP and wherein the end user client device moves the follow-on advertisements to the PIP display, and a scrollable follow-on queue for display when one of the sub group advertisements is selected from the PIP display, wherein the follow-on queue indicates the plurality of follow-on advertisements relating to the advertisement in the main display, when of the sub group advertisements is selected from the PIP display and less than all of the plurality of follow-on advertisements are displayed in an on screen PIP queue display, wherein a display mode data indicates how the sub group advertisements and follow-on advertisements are displayed as a main screen display, an on screen picture-in-picture (PIP) display and off screen PIPs to be scrolled on to the end user client device PIP display queue;

displaying in the PIP queue display on the end user device display, a set of follow-on advertisements comprising less than all of the plurality of follow-on advertisements;

rotating one of the set of follow-on advertisements off of the on-screen PIP queue display to an off-screen queue; and rotating another one of the follow-on advertisements from the off-screen queue to the on screen PIP queue display.

9. The medium of claim 8, wherein the group of targeted advertisements further comprises a group display queue, the group display queue comprising data indicating a display mode for the group of advertising data and wherein the follow-on advertising data further comprises a follow-on display queue, the follow-on display queue comprising data indicating display mode data for the follow-on advertising.

10. The medium of claim 9, wherein the display mode data indicates advertisements display selected from the group consisting or a main screen display, an on screen picture-in-picture (PIP) display and off screen PIP.

11. The medium of claim 8, wherein the group of targeted advertisements further comprises sub-group targeted advertisements wherein the group targeted advertisements contains advertisements targeted to the group of end user client devices and the sub-group targeted advertisements contains advertisements targeted to a sub-group of end user client devices, the computer program further comprising instructions to multicast the sub-group targeted advertisements to the sub-group of end user client devices.

12. The medium of claim 8, wherein the group of targeted advertising data further comprises at least one household advertisements wherein the household advertisements contain advertisements targeted to a household, the computer program further comprising instructions to unicast the household advertisements to an end user client device associated with the household.

13. The medium of claim 12, wherein the household advertisements further comprise at least one individual viewer advertisements wherein the individual viewer data contains advertisements targeted to an individual viewer in the household, the computer program further comprising instructions to unicast the individual viewer advertising data to an end user client device associated with an individual viewer.

14. The medium of claim 8, the computer program further comprising instructions to insert the targeted advertising data into a video data stream at the IPTV server when a measured IPTV network value is above a predetermined value; and instructions to insert the targeted advertisements at the end user client device when the measured IPTV network value is less than the predetermined value.

15. The medium of claim 14, wherein the measured IPTV network value is selected from the group consisting of available IPTV bandwidth between an IPTV server and the end user client device and available storage at the end user client device.

16. The medium of claim 14, wherein the display mode data indicates advertisements display selected from the group consisting of a main screen display, on screen picture-in-picture (PIP) display and off screen PIP.

17. A system for delivering targeted advertisements over an internet protocol television (IPTV) network, the system comprising:

a processor in data communication with an end user client device;

a memory containing data embedded in a non-transitory computer readable storage medium in data communication with the processor; and a computer program stored in memory, for execution by the processor, the computer program comprising instructions to multicast from an IPTV server a group of targeted advertisements to a group of end user client devices; and a plurality of follow-on advertisements for at least one of a sub group advertisements, wherein the end user client device accepts end user input data controls which one of the sub group of advertisements appears in the PIP and wherein the end user client device moves the follow-on advertisements to the PIP display and a scrollable follow-on queue when one of the sub group advertisements is selected form the PIP display, wherein the follow-on queue indicates the plurality of follow-on advertisements relating to the advertisement in the main display, when one of the sub group advertisements is selected from the PIP display and less than all of the plurality of follow-on advertisements are displayed in an on screen PIP queue display, wherein a display mode indicates how the sub group advertisements and follow-on advertisements are displayed as a main screen display, an on screen picture-in-picture (PIP) display and off screen PIPs to be scrolled on to the end user client device PIP display queue;

displaying in the PIP queue display on the end user device display, a set of follow-on advertisements comprising less than all of the plurality of follow-on advertisements;

rotating one of the set of follow-on advertisements off of the on-screen PIP queue display to an off-screen queue; and rotating another one of the follow-on advertisements from the off-screen queue to the on screen PIP queue display.

18. The system of claim 17, wherein the group of targeted advertisements further comprises a group display queue, the group display queue comprising data indicating a display mode for the group of advertisements and wherein the follow-on advertisements further comprises a follow-on display queue, the follow-on display queue comprising data indicating display mode data for the follow-on advertising.

19. The system of claim 17, wherein the group of targeted advertising data further comprises sub-group targeted advertising data wherein the group targeted advertisements contains advertising data targeted to the group of end user client devices and the sub-group targeted advertisements contains advertising data targeted to a sub-group of end user client devices.

20. The system of claim 17, wherein the group data further comprises at least one household advertisement wherein the household advertisement contains advertising data targeted to a household, the computer program further comprising instructions to unicast the household advertisements to an end user client device associated with the household.

21. The system of claim 20, wherein the household advertisements further comprise at least one individual viewer advertisement wherein the individual viewer data contains an advertisement targeted to an individual viewer in the household, the computer program further comprising instructions to unicast the individual viewer advertisement to an end user client device associated with an individual viewer.

22. The system of claim 17, the computer program further comprising instructions to insert the targeted advertisements into a video data stream at the IPTV server when a measured IPTV network value is above a predetermined value; and instructions to insert the targeted advertisements at the end user client device when the measured IPTV network value is less than the predetermined value.

23. The system of claim 22, wherein the measured internet protocol television (IPTV) network value is selected from the group consisting of available IPTV bandwidth between an IPTV server and the end user client device and available storage at the end user client device.

24. A data structure in memory embedded in a tangible non-transitory computer readable storage medium, the data structure comprising:
an advertisements field for containing a follow-on queue, advertisements and a plurality of follow-on advertisements for the advertisement received together in a video stream, indicating advertisements and follow-on advertisements targeted to a group of end user client devices in an internet protocol television (IPTV) system; and
a display queue field for containing data indicating display mode data for the advertisements wherein the follow-on queue indicates the plurality of follow-on advertisements relating to the advertisement in the main display, when one of the sub group advertisements is selected from the PIP display and less than all of the plurality of follow-on advertisements are displayed in an on screen PIP queue display, wherein the display mode data indicates how the sub group advertisements and follow-on advertisements are displayed as a main screen display, an on screen picture-in-picture (PIP) display and off screen PIPs to be scrolled on to the end user client device PIP display queue;
displaying in the on screen PIP queue display on the end user device display, a set of follow-on advertisements comprising less than all of the plurality of follow-on advertisements;
a computer program field for containing instructions executed by a computer, the computer program further comprising instructions to rotate one of the set of follow-on advertisements off of the on-screen PIP queue display to an off-screen queue; and
instructions rotate another one of the follow-on advertisements from the off-screen queue to the on screen PIP queue display.

25. The data structure of claim 24, wherein the display mode data indicates advertisements display selected from the group consisting of a main screen display, an on screen picture-in-picture (PIP) display and off screen PIP.

26. The data structure of claim 24, further comprising a follow-on advertisements field for containing advertising data related to the advertisements in the advertising data field.

27. The data structure of claim 24, further comprising:
an IPTV bandwidth available field for containing data indicating available bandwidth between an IPTV server and an end user client device; and
a household storage available field for containing data indicating available storage at an end user client device associated with a household.

28. An end user client device for receiving targeted advertising data from an internet protocol television (IPTV) server, the end user client device further comprising:
a processor coupled to a memory containing data embedded in a tangible non-transitory computer readable storage medium; and
a computer program stored in the memory for execution by the processor, the computer program comprising instructions to receive from an internet protocol television (IPTV) server a multicast comprising a group of targeted advertisements and a plurality of follow-on advertisements for at least one of the group of targeted advertisements, wherein the end user client device accepts end user input data and control which one of the group of advertisements appears in the PIP and wherein the end user client device moves the follow-on advertisements to the PIP display and a scrollable follow-on queue when one of the group advertisements is selected from the PIP display wherein the follow-on queue indicates the plurality of follow-on advertisements relating to the advertisement in the main display, when one of a sub group of advertisements is selected from the PIP display and less than all of the plurality of follow-on advertisements are displayed in an on screen PIP queue display, wherein a display mode data indicates how the sub group advertisements and follow-on advertisements are displayed as a main screen display, an on screen picture-in-picture (PIP) display and off screen PIPs to be scrolled on to the end user client device PIP display queue;
displaying in the PIP queue display on the end user device display, a set of follow-on advertisements comprising less than all of the plurality of follow-on advertisements;
rotating one of the set of follow-on advertisements off of the on screen PIP queue display to an off-screen queue; and
rotating another one of the follow-on advertisements from the off-screen queue to the on screen PIP queue display.

29. The client device of claim 28, wherein the group of targeted advertisements further comprises group display queue data, the group display queue data comprising data indicating a display mode for the group of advertisements and wherein the follow-on advertisements further comprises a follow-on display queue, the follow-on display queue comprising data indicating a display mode for the follow-on advertisements, the computer program further comprising instructions receive group display queue and display the group of targeted advertisements in the mode in the group display queue.

30. The client device of claim 28, wherein the display queue data indicates advertisements display selected from the group consisting of a main screen display, an on screen picture-in-picture (PIP) display and off screen PIP.

31. A tangible non-transitory computer readable storage medium containing a computer program for receiving targeted advertising from an internet protocol television (IPTV) server, the computer program comprising:
instructions to receive from an IPTV server a multicast comprising a group of targeted advertisements and a follow-on queue indicating a plurality of follow-on advertisements for at least one of the group of targeted advertisements, wherein the end user client device accepts end user input data and control which one of the group of advertisements appears in the PIP and wherein the end user client device moves the follow-on advertisements to the PIP display and a scrollable follow-on queue when one of the group advertisements is selected from the PIP display wherein the follow-on queue indicates a plurality of follow-on advertisements relating to the advertisement in the main display, when one of the sub group advertisements is selected from the PIP display and less than all of the plurality of follow-on advertisements are displayed in an on screen PIP queue display, wherein a display mode data data indicates how the sub group advertisements and follow-on advertisements are displayed as a main screen display, an on screen picture-in-picture (PIP) displays and off screen PIPs to be scrolled on to the end user client device PIP display queue; a computer program containing instructions executed by a computer, the computer program further comprising, instructions to display in the PIP queue display on the end user device display, a set of follow-on advertisements comprising less than all of the plurality of follow-on advertisements;

instructions to rotate one of the set of follow-on advertisements off of the PIP queue display to an off-screen queue; and instructions rotate another one of the follow-on advertisements from the off-screen queue to the on screen PIP queue display.

\* \* \* \* \*